(12) United States Patent
Tibbenham et al.

(10) Patent No.: US 7,029,138 B2
(45) Date of Patent: Apr. 18, 2006

(54) TRUNK RELEASE HANDLE FOR AUTOMOBILES

(75) Inventors: Patricia C. Tibbenham, West Bloomfield, MI (US); David Dean, Commerce Township, MI (US); Wieslaw S. Zaydel, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 10/603,676

(22) Filed: Jun. 25, 2003

(65) Prior Publication Data

US 2004/0160760 A1      Aug. 19, 2004

Related U.S. Application Data

(60) Provisional application No. 60/448,187, filed on Feb. 18, 2003.

(51) Int. Cl.
*F21V 9/16* (2006.01)
(52) U.S. Cl. .................. 362/84; 362/488; 362/501; 362/542; 362/812
(58) Field of Classification Search .................. 362/84, 362/488, 501, 542, 458, 812, 100, 540; 340/456, 340/426.29; 200/61.85, 61.87, 61.88, 61.91; 292/DIG. 42, DIG. 43, 336.3, DIG. 65, DIG. 14, 292/347; 40/318, 542, 556
See application file for complete search history.

(56) References Cited

U.S. PATENT DOCUMENTS

| | | | | |
|---|---|---|---|---|
| 2,125,780 A | | 8/1938 | Goggin | 40/134 |
| 2,459,693 A | * | 1/1949 | Gordon | 250/483.1 |
| 2,654,971 A | | 10/1953 | Harrison | 40/134 |
| 4,744,012 A | | 5/1988 | Bergkvist | 362/84 |
| 6,349,984 B1 | * | 2/2002 | Marrazzo et al. | 292/336.3 |
| 6,369,395 B1 | * | 4/2002 | Roessler | 250/462.1 |
| 6,394,511 B1 | | 5/2002 | Lam | 292/336.3 |

* cited by examiner

*Primary Examiner*—Sandra O'Shea
*Assistant Examiner*—Sharon Payne
(74) *Attorney, Agent, or Firm*—Gigette M. Bejin; Miller Law Group

(57) ABSTRACT

An emergency trunk release handle for an automobile displays the graphics explaining the use and function of the handle by cutting out the material from the handle. Forming the emergency release handle from a phosphorescent plastic material that can be formed by a molding process, such as injection molding, the cut-out graphics show as darkened areas, when viewed in the dark confines of an automobile trunk, to provide a high degree of visibility for the graphics. The graphics are also visible when seen against the dark carpet in the interior of an opened trunk cavity. The formation of the graphics is accomplished by coring the mold in the configuration of the desired graphics and by forming the plastic material in the mold around the cores. The resultant handle structure is thus formed in a cost effective manner that reduces the process failure potential during the manufacturing of the handle.

19 Claims, 2 Drawing Sheets

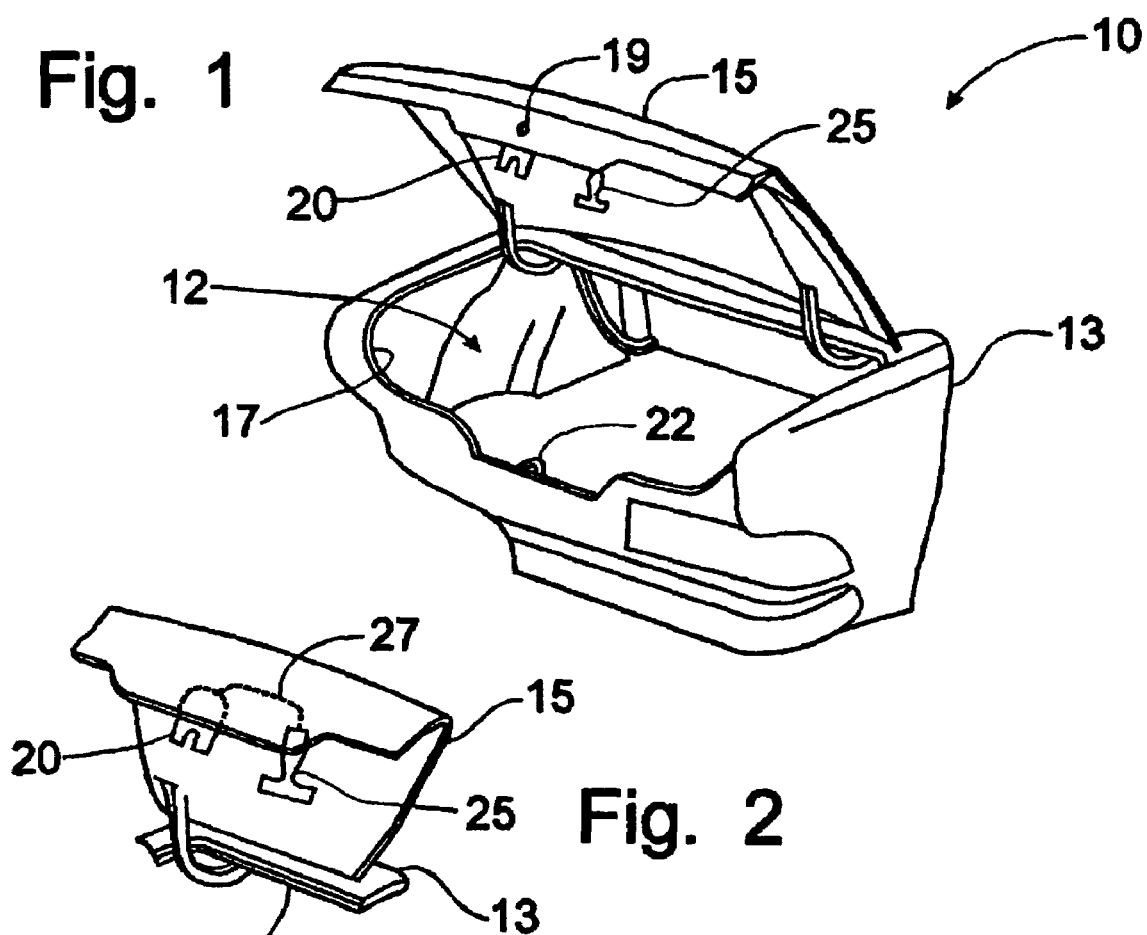
Fig. 1
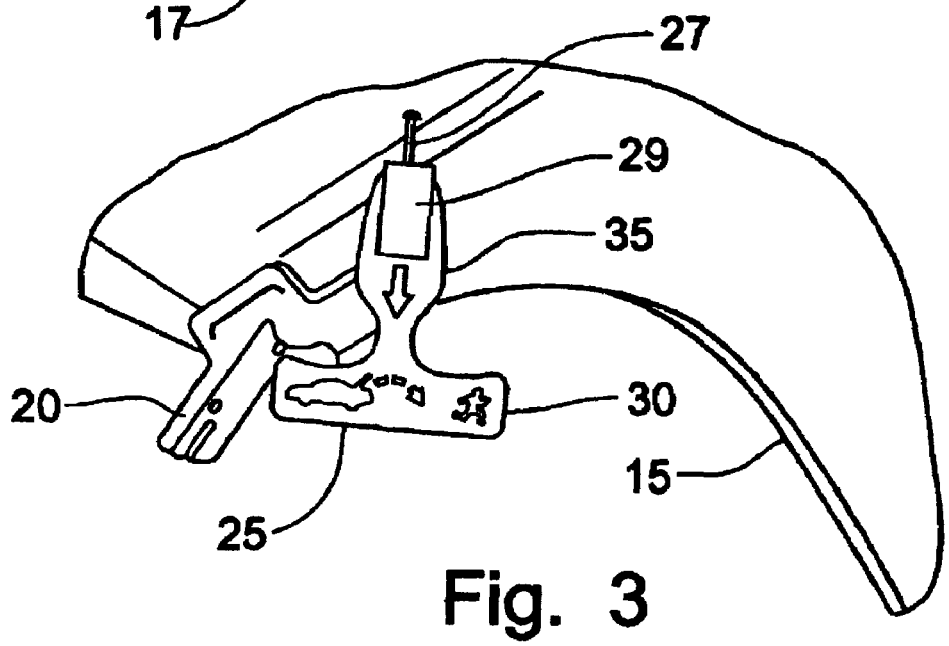
Fig. 2
Fig. 3

TRUNK RELEASE HANDLE FOR AUTOMOBILES

CROSS-REFERENCE TO RELATED APPLICATIONS

This application claims domestic priority on U.S. Provisional Patent Application Ser. No. 60/448,187, filed on Feb. 18, 2003, and entitled "Cost Reduced Trunk Release Handle", the contents of which are incorporated herein by reference.

BACKGROUND OF THE INVENTION

Automobile trunks require an emergency release mechanism to permit a person trapped accidentally within the confines of the automobile trunk with the trunk lid closed and locked to be able to effect a release of the locked trunk lid and permit the person to escape from the confines of the automobile trunk. The release mechanism is actuated by pulling on an emergency trunk release handle. Conventional emergency trunk release handles are formed from a phosphorescent plastic material, i.e. a material that glows in the dark.

A label containing printed material to explain graphically the use of the release handle to effect operation of the emergency release mechanism is mounted on the surface of the plastic material only after an adhesion promotion process is applied, i.e. adhesion promotion material, flame treatment, or plasma treatment. The graphics and/or directions for the use of the handle are difficult to see in the dark when the utilization of the handle would be required. It would be desirable to produce a glow-in-the-dark plastic handle without the need to prepare the surface of the material with adhesion enhancement process and also any need to print and/or paint any graphics or directions onto the material.

Emergency trunk release handles are known in the prior art, as is represented by U.S. Pat. No. 6,394,511, issued to Michael K. Lam, et al, on May 28, 2002. In this Lam patent, which is the specific emergency release handle over which the instant invention presents an improvement, the T-shaped handle is formed from phosphorescent material, or is formed of a dark plastic on which the images are printed in a phosphorescent material so that the images will glow in the dark.

A phosphorescent vehicle trunk release handle is also taught in U.S. Pat. No. 6,369,395, issued to David M. Roessler on Apr. 9, 2002. Light to enhance the excitement of the phosphorescent material is directed into the truck adjacent the emergency release handle to allow the handle to glow in the dark without requiring the trunk lid to be opened or the utilization of electricity.

The use of electricity to illuminate a light source that causes a fluorescent material to produce letters and numbers on a sheet of material is taught in U.S. Pat. No. 4,744,012, issued to Lars A. Bergkvist on May 10, 1988. Similarly, the utilization of a luminous material to glow through transparent material, with opaque material blocking the release of light, to illuminate a sign is taught in U.S. Pat. No. 2,654,971, issued to G. R. Harrison on Oct. 13, 1953, while U.S. Pat. No. 2,125,780, issued to J. F. Goggin on Aug. 2, 1938 uses a luminescent material on the sign to effect illumination.

Conventional manufacturing processes would involve insert molding or affixation of the label after the plastic handle was formed from a molding process, such as injection molding. Accordingly, it would be desirable to provide an improved emergency release handle that would provide superior visibility. Furthermore, the printing of the graphics on a pad or label for affixation to the emergency release handle is a costly process to manufacture the emergency release handle.

SUMMARY OF THE INVENTION

It is an object of this invention to overcome the aforementioned disadvantages of the known prior art by providing an emergency trunk release handle that is formed of phosphorescent material in which the graphics are cut out of the material.

It is another object of this invention to provide an emergency trunk release handle that will provide superior visibility of the graphics providing instructions on the use and operation of the release handle.

It is a feature of this invention that the cut out areas of the plastic emergency trunk release handle show as darkened areas, which contrast with the glowing phosphorescent handle to enable the graphics to be seen in the dark.

It is an advantage of this invention that the graphics on an emergency trunk release handle can be easily seen in the dark.

It is another advantage of this invention that the cost of producing an emergency trunk release handle is reduced.

It is still another advantage of this invention to provide the potential for improved manufacturing process robustness and the reduction of process failure modes of the emergency automobile trunk release handle.

It is another feature of this invention that the cutout graphics in the plastic material of an emergency trunk release handle can be formed during the molding manufacturing process without additional labor required for the placement of decals or labels.

It is yet another advantage of this invention that the adhesion promotion process and painting, and/or printing, graphics or directions onto the surface of the handle is eliminated.

It is yet another advantage of this invention that the user of the handle, particularly when trapped in the darkened confines of an automobile trunk, is better able to identify the location of the handle, as well as the use of the handle to allow the user to escape from the automobile trunk.

It is still another feature of this invention that the formation of the graphics in the material forming an emergency trunk release handle can be accomplished by coring the mold from which the handle is formed.

It is a further object of this invention to provide an emergency automobile trunk release handle that is more reliable than pad printing and/or painting, durable in construction, inexpensive of manufacture, carefree of maintenance, facile in assemblage, and simple and effective in use.

These and other objects, features and advantages are accomplished according to the instant invention by providing an emergency trunk release handle for an automobile in which the graphics explaining the use and function of the handle are displayed by cutting out the material from the handle. Forming the emergency release handle from a phosphorescent plastic material that can be formed by a molding process, such as injection molding, the cut-out graphics show as darkened areas, when viewed in the dark confines of an automobile trunk, to provide a high degree of visibility for the graphics. The formation of the graphics is accomplished by coring the mold in the configuration of the desired graphics and by forming the plastic material in the mold around the cores. The resultant handle structure is thus formed in a cost effective manner that reduces the process failure potential during the manufacturing of the handle.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a schematic perspective view of a vehicle trunk in which the instant invention can be utilized, the trunk lid being depicted in the opened position;

FIG. 2 is an enlarged perspective view of the latch area of the vehicle trunk depicting the utilization of the instant invention;

FIG. 3 is an enlarged interior view of the automotive trunk depicted in FIG. 2 to show the utilization of the instant invention;

DETAILED DESCRIPTION OF THE PREFERRED EMBODIMENT

Figure 4:
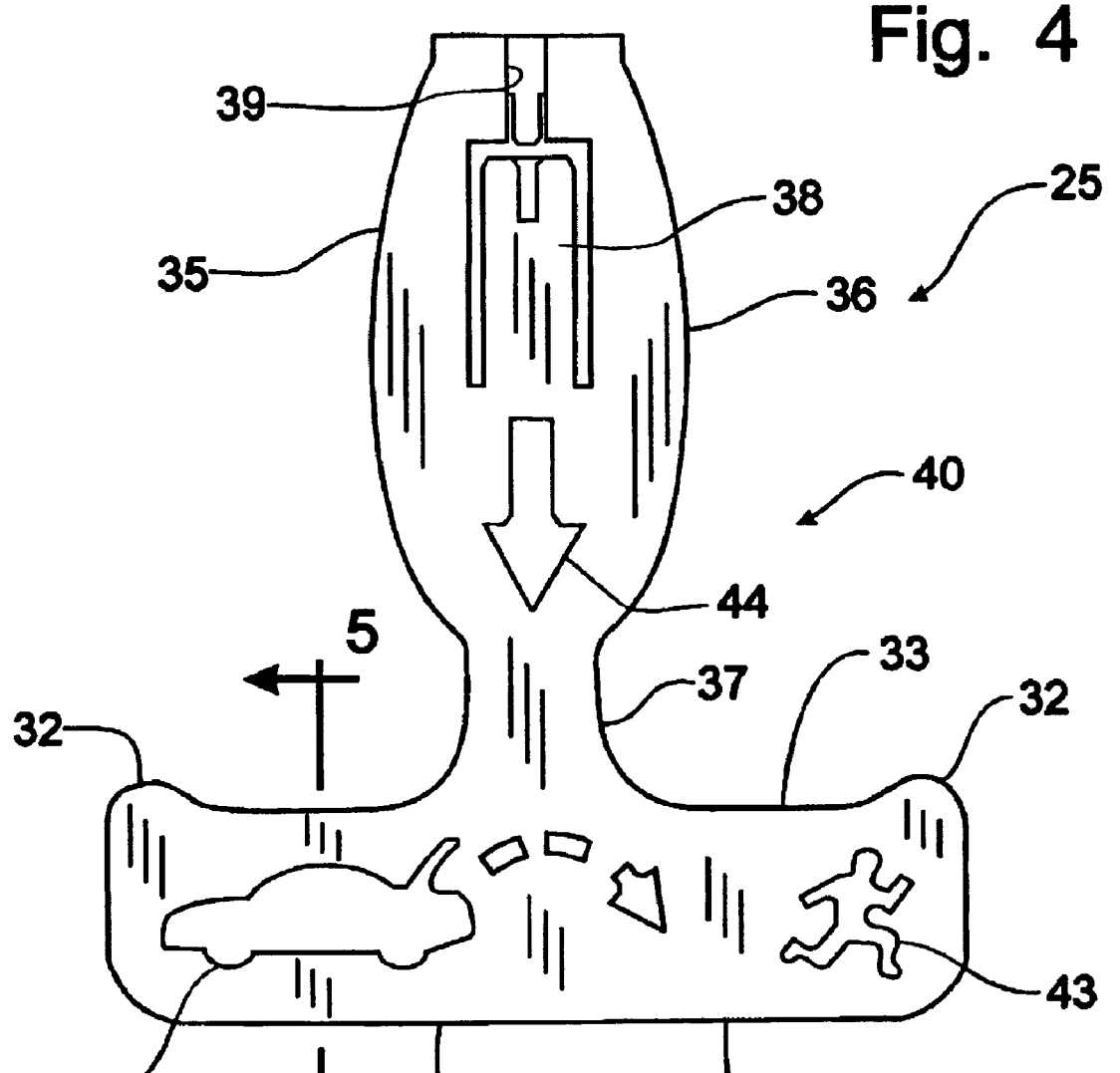
FIG. 4 is an enlarged plan view of the emergency trunk release handle incorporating the principles of the instant invention.

Referring to FIGS. 1–3, an automotive vehicle trunk having an emergency trunk release handle incorporating the principles of the instant invention can be seen. The automotive vehicle 10 incorporates a trunk 12 at a rear portion thereof which is provided with a trunk lid 15 positionable against the chassis 13 of the vehicle 10 to close the trunk opening 17 through which access to the trunk cavity 12 can be gained. The trunk lid 15 is pivotally movable between an opened position, depicted in FIGS. 1–3, and a closed position in which the opening 17 is closed and no access to or from the trunk cavity 12 can be gained.

A latch mechanism 20 is provided on the rear portion of the trunk lid 15 to lock the trunk lid 15 in the closed position. The latch mechanism 20 is engagable with a striker member 22 mounted at a corresponding position on the chassis 13 to cooperate with the latch mechanism 20 to secure the trunk lid 15 against the chassis 13. The latch mechanism 20 is movable between a latched position and an unlatched position, corresponding to the closed and opened positions of the trunk lid 15. Typically, the latch mechanism 20 is operated through a key (not shown) insertable through a key hole 19, or through an internal trunk release mechanism (not shown) accessible within the operative compartment (not shown) forwardly of the trunk cavity 12, to effect operation of the latch mechanism 20 to permit the trunk lid 15 to be opened from the locked, closed position.

From an emergency standpoint, the latch mechanism 20 is also operable from appropriate manipulation of an emergency release handle 25 that is positioned within the trunk cavity 12 for access to permit operation of the latch mechanism 20 from the inside of the trunk cavity 12 when the trunk lid 15 is in the closed and locked position. The emergency release handle 25 is connected to the latch mechanism 20 by a cable 27 that actuates the latch mechanism 20 when the handle 25 is grasped and pulled in a generally downwardly direction. A general description of the operation of the latch mechanism 20 can be found in U.S. Pat. No. 6,394,511, issued to Michael King Lam, et al, assigned to Ford Global Technologies, Inc., and entitled "Automotive Vehicle Decklid Latch System", the contents of which are incorporated herein by reference.

Preferably, the emergency release handle 25 is positioned within the trunk cavity 12 to hang from the trunk lid 15 in a generally vertical orientation so as to be easily visible and accessible from the underside of the trunk lid 15 when in the closed position. Even when the trunk lid 15 is in the opened position, as depicted in FIGS. 1–3, the emergency release handle 25 will hang vertically to provide a handle by which the trunk lid 15 can be retrieved from the opened position. One skilled in the art, however, will recognize that so long as the emergency release handle 25 is being pulled against the latch mechanism 20, the latch mechanism 20 will not latch against the striker 22 and, thus, the trunk lid 15 would not lock against the chassis 13 until the emergency release handle 25 is released.

Figure 5:
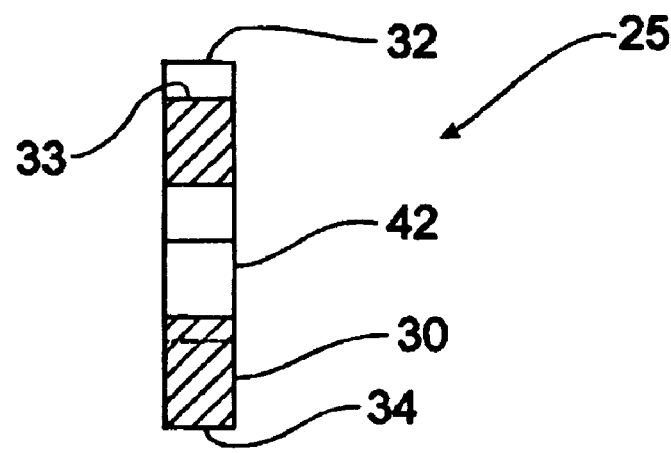
FIG. 5 is an enlarged cross-section view through the trunk release handle corresponding to lines 5—5 of FIG. 4.

Referring now to FIGS. 4 and 5, the emergency release handle 25 is preferably formed of a phosphorescent material, such as a phosphorescent plastic, for example polypropylene, that will be energized by the receipt of light thereon for a short period of time and then be operative to emit light for an extended period of time after the light source has been removed, i.e. a material that will glow in the dark. As noted in the aforementioned U.S. Pat. No. 6,394,511, the trunk lid 15 or the chassis 13 may be formed with light transmitting passageways (not shown) that may be operative to energize the phosphorescent material to extend the period over which the material will emit light; however, exposure to light when the trunk lid 15 is opened will provide some measure of time during which the phosphorescent material will glow in the darkened trunk cavity 12 after the trunk lid 15 is closed against the chassis 13.

The emergency release handle 25 is preferably formed in a T-shape that has a grasp portion 30 and a shaft portion 35 which are oriented generally perpendicularly to one another. The shaft portion 35 is preferably formed with an enlarged head portion 36 and a narrowed neck portion 37 located between the head portion 36 and the grasp portion 30 to facilitate a gripping of the grasp portion 30. The shaft portion 35 of the emergency release handle 25 is formed with a deformable clip member 38 that is cooperable with a groove 39 formed at the top of the head portion 36 to effect a connection of the cable 27. For example, the cable 27 could be formed with a bead (not shown) or affixed to a mating snap member 29 that would be engagable with the clip member 38 to affix the cable 27 to the emergency release handle 25.

The grasp portion 30 is preferably formed with raised corners 32 that project above a first surface 33 to which the neck portion 37 is connected to the grasp portion 30. The distance between the first surface 33 and a second surface 34, which is generally parallel to the first surface 33 and spaced therefrom, defines the width dimension of the grasp portion 30. This particular configuration of the grasp portion 30 forming a T-shaped handle comprises a handle shape that is believed to facilitate the grasping of the emergency release handle 25 by a person within the trunk cavity 12 whether young or old.

To further facilitate the use of the emergency release handle 25, graphics 40 are imposed on the handle 25. As noted in the aforementioned U.S. Pat. No. 6,394,511, the graphics 40 are preferably in a form to present informational images to convey the purpose of the emergency release handle 25. For example, an image 42 of a vehicle with an open trunk and a caricature 43 of a person jumping from the vehicle can be placed on the grasp portion 30 of the handle 25, while an arrow 44, or other image depicting the downward movement of the handle 25 to effect the images 42, 43 on the grasp portion 30, can be placed on the shaft portion 35.

As further noted in the aforementioned U.S. Pat. No. 6,394,511, these images are typically printed onto the front and back faces 26 in black to blank off the phosphorescent material so that any light emitted from the phosphorescent material will not shine through the printed graphics. Preferably, the phosphorescent material from which the emergency release handle 25 is formed would be a light color, such as yellow, light green, green-yellow, or white so that the black printed images would contrast with the surrounding material to present a visible image to the user thereof.

The printing of these graphics onto the faces 26 of the emergency release handle 25 has presented process problems in which an insufficient amount of printing or a lack of sharpness in the printing of the image can result in a blurring of the graphic image. The rejection of such improperly formed handles 25 leads to higher manufacturing costs, as does the printing process which adds additional steps to the manufacture of the existing emergency release handles 25.

The heretofore known printing process requires an adhesion promotion process, which is difficult to control and detect during the manufacturing process for the handle 25. The graphic images may be printed or painted onto the surface of the material, but printed graphics may peel and painted graphics may chip and ultimately become unrecognizable.

According to the principles of the instant invention, as depicted in FIGS. 4 and 5, the graphics 40 are cut out of the material forming the emergency release handle 25, rather than having the graphics printed on the face surfaces 26 of the handle 25. In the darkened trunk cavity 12 with the trunk lid 15 closed against the chassis 13, the cut-out graphics emit no light and show as a sharp darkened area against the otherwise light phosphorescent material from which the body of the emergency release handle 25 is formed. Since no graphics are printed onto the faces 26 of the handle 25, there is no concern over the quality or quantity of the printed material. Furthermore, the contrasting color of the carpet typically places within the trunk 12 will also make the graphic image visible even when not in a darkened trunk cavity 12.

To effect the cut-out graphics, the mold (not shown) from which the handle 25 is formed is equipped with cores that are in the shape of the desired graphics 40 and placed at the appropriate locations in the mold to prevent the formation of material at the graphic locations. One skilled in the art will recognize that a third core (not shown) would be placed at the top of the shaft portion to form the clip member 38 in a conventional manner.

As a result, one skilled in the art will recognize that the manufacturing process is substantially simplified and, thus, reduced in cost as no subsequent manufacturing steps are required to imprint the graphics onto the face surfaces 26 of the emergency release handle 25. Furthermore, such a manufacturing process has a substantially lower failure rate for producing finished handles 25. Visibility of the informational graphics 40 is also enhanced as the cut-out images 42–44 are inherently sharply defined since there is no phosphorescent material within the image 42–44 to emit light.

Alternatively, the graphic images 42–44 could be cut out of the handle 25 after then emergency release handle 25 is formed and separated from the mold (not shown). Cutting technology would permit the sharp cutting of the images 42–44; however, such a process would significantly increase the manufacturing cost for the handle 25 as subsequent manufacturing steps would be required to produce the final finished product 25, even though the end result of sharper informational graphics 40, as compared to painting or pad printing the graphics 40, could be obtained.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A handle for use in an automobile to effect a desired operation comprising:
   a shaft portion formed of a light emitting material;
   a grasp portion formed of said light emitting material and being connected to said shaft portion to permit a manipulative gripping of said handle; and
   a first hole formed within said grasp portion in the shape of a first open informational image such that no light emitting material is present within or underlies said first open informational image, said first informational image being visible due to said light emitting material surrounding a perimeter of said first hole.

2. The handle of claim 1 wherein said shaft portion and said grasp portion form a T-shaped configuration.

3. The handle of claim 2 wherein a second hole is formed within said shaft portion in the shape of a second open informational image such that no light emitting material is present within or underlies said second open informational image, said second informational image being visible due to said light emitting material surrounding said second hole.

4. The handle of claim 3 wherein said first open informational image forms an image of a vehicle with an open trunk with a caricature of a person jumping out of the open trunk, said handle being an emergency trunk release handle.

5. The handle of claim 3 wherein said light emitting material is a phosphorescent plastic.

6. The handle of claim 5 wherein said shaft portion is formed with a deformable clip member.

7. The handle of claim 5 wherein said shaft portion is formed with an enlarged head portion and a neck portion, having a width dimension narrower than a corresponding width dimension of said head portion, interconnecting said head portion and said grasp portion, said second open informational image being located in said head portion.

8. The handle of claim 7 wherein said second open informational image is an arrow pointing toward said grasp portion.

9. In a handle mounted on an automobile to effect selective actuation of a latch mechanism, said handle being formed of material that includes phosphorescent composition and including a shaft portion connected to a grasp portion to facilitate the gripping of said handle to actuate said latch mechanism, the improvement comprising:
   holes formed in said handle in the shape of open informational images with no material present within said holes, said holes defining said informational images being surrounded by said material including phosphorescent material composition such that said informational image is visible when the material surrounding said informational image glows due to said phosphorescent material being present.

10. The handle of claim 9 wherein a first said open informational image is formed in said grasp portion.

11. The handle of claim 10 wherein a second said open informational image is formed in said shaft portion.

12. The handle of claim 11 wherein said shaft portion and said grasp portion are connected to form a T-shape configuration.

13. The handle of claim 12 wherein said handle is an emergency trunk release handle operatively connected to a trunk lid latch mechanism locking said trunk lid to an automobile chassis, said first open informational image forming an image of a vehicle with an open trunk with a caricature of a person jumping out of the open trunk, said second informational image forming an arrow pointing toward said grasp portion.

14. The handle of claim 13 wherein said shaft portion is formed with an enlarged head portion, having a deformable clip member formed therein, and a narrow neck portion interconnecting said head portion and said grasp portion, said second open informational image being located in said head portion.

15. A handle for use in an automobile to effect a desired operation comprising:
   a shaft portion formed of a light emitting material and including a deformable clip member;
   a grasp portion formed of said light emitting material and being connected to said shaft portion to form a T-shaped configuration and permit a manipulative gripping of said handle; and
   a first hole formed within said grasp portion in the shape of a first open informational image and a second hole formed in said shaft portion in the shape of a second open informational image said first open informational image and said second open informational image being devoid of light emitting material such that said first and second images are visible due to said light emitting material surround said first and second holes.

16. The handle of claim 15 wherein said first open informational image forms an image of a vehicle with an open trunk with a caricature of a person jumping out of the open trunk, said handle being an emergency trunk release handle.

17. The handle of claim 16 wherein said light emitting material is a phosphorescent plastic.

18. The handle of claim 17 wherein said shaft portion is formed with an enlarged head portion and a neck portion, having a width dimension narrower than a corresponding width dimension of said head portion, interconnecting said head portion and said grasp portion, said second open informational image being located in said head portion.

19. The handle of claim 18 wherein said second open informational image is an arrow pointing toward said grasp portion.

* * * * *